United States Patent [19]

Gustafson et al.

[11] Patent Number: 5,696,880
[45] Date of Patent: Dec. 9, 1997

[54] COMMUNICATION SYSTEM USER AUTHENTICATION METHOD

[75] Inventors: David T. Gustafson, Gilbert; Richard G. Shepherd; Robert D. Frith, both of Scottsdale, all of Ariz.

[73] Assignee: Motorola, Inc., Schaumburg, Ill.

[21] Appl. No.: 494,745

[22] Filed: Jun. 26, 1995

[51] Int. Cl.$^6$ .................................................. G10L 5/00
[52] U.S. Cl. ........................... 395/2.82; 395/2.79; 379/95
[58] Field of Search ........................... 395/2.84, 2.82, 395/2.79, 2.81; 379/243, 95, 93; 380/18, 41, 33

[56] References Cited

U.S. PATENT DOCUMENTS

| | | | |
|---|---|---|---|
| 3,752,904 | 8/1973 | Waterbury | 178/5.1 |
| 3,896,266 | 7/1975 | Waterbury | 179/1 SB |
| 5,054,083 | 10/1991 | Naik et al. | 381/42 |
| 5,153,918 | 10/1992 | Tuai | 380/25 |
| 5,181,238 | 1/1993 | Medamana et al. | 379/95 |
| 5,216,720 | 6/1993 | Naik et al. | 381/43 |
| 5,247,575 | 9/1993 | Sprague et al. | 380/4 |
| 5,392,357 | 2/1995 | Bulfer et al. | 380/33 |
| 5,434,920 | 7/1995 | Cox et al. | 380/49 |
| 5,473,691 | 12/1995 | Menezes et al. | 380/25 |
| 5,530,472 | 6/1996 | Bregman et al. | 348/15 |
| 5,550,976 | 8/1996 | Henderson et al. | 395/200.06 |
| 5,572,571 | 11/1996 | Shirai | 379/58 |

OTHER PUBLICATIONS

IEE Colloquium on 'Designing Secure Systems'; Hawkes, "Automatic user authentication & access control", p. 6/1–4 Jun., 1992.

Primary Examiner—Allen R. MacDonald
Assistant Examiner—Richemond Dorvil
Attorney, Agent, or Firm—Frank J. Bogacz

[57] ABSTRACT

The authentication method established a communication link between the calling and called users (14). The calling and called parties exchange voice identification data (22). The calling and called parties determine if the voice identification data compares (26,30). If voice identification data compares, a secure call is enabled (32). If the voice identification data does not compare the communication link is terminated (20).

17 Claims, 2 Drawing Sheets

COMMUNICATION SYSTEM USER AUTHENTICATION METHOD

BACKGROUND OF THE INVENTION

The present invention pertains to telephony and more particularly to a secure communications method for rapid authentication of users.

Authentication of a particular user is important for many electronic secure communications products which require a "training" session at the onset of communications in order to establish a communication link and to verify the identity of a caller and to assure the credibility of communications security.

Many secure communications systems suffer from lack of ease of use. Typically, a physical key, also known as a "crypto ignition key", is inserted into a secure communications device as a token signifying authorization to employ the device and to verify the key-bearer's credentials. This arrangement is generally satisfactory, but the key is subject to being stolen or lost. The user must also initiate a complicated procedure to use the secure communications device. Such systems require that the secure communications device include a receptacle for the key and associated electronics which adds to the size, weight and desktop footprint of the secure communications device. Further such devices are prohibitively expensive for commercial uses.

A particular problem against which secure commercial telecommunications devices need to defend is a scenario dubbed "the man in the middle", wherein a third party (the "man in the middle") wishing to intercept and/or alter privileged communications "taps" into the path between calling and called parties' secure communications devices with a pair of communications devices similar in nature to those of either or both of the calling and/or called parties. The pair are configured to intercept the communications and may conceivably "train" right along with the secure communications devices employed by the calling party and the called party.

Thus, what is needed is a secure, commercially economical authentication method for rapidly authenticating a user of commercial communications equipment.

DESCRIPTION OF THE PREFERRED EMBODIMENT

The voice authentication method may be accomplished using a commercial secure telephone architecture. Examples of such commercial telephones include Micro MMT, Sectel 1500BDI, and most other Motorola secure phones manufactured by Motorola, Inc.

Figure 1:
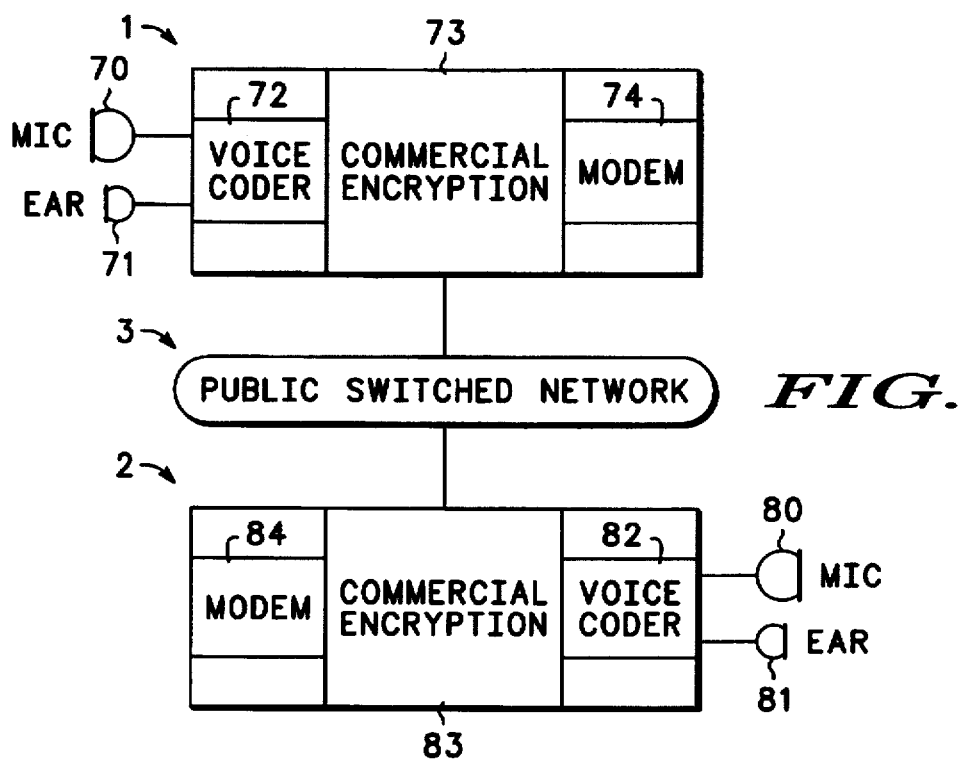
FIG. 1 is a block diagram of a communication system interconnection of users in accordance with the present invention.

Refering to FIG. 1 commercial secure phones 1 and 2 are shown. Users are associated with these phones. A calling party is associated with phone 1 and a called party is associated with phone 2, for example. Phones 1 and 2 each include a vocoder 72 & 82 for voice compression and decompression, a microphone 70 & 80 for voice input, an earphone 71 & 81 for voice output, a commercial encryption/decryption function 73 & 83, and a modem 74 & 84 for transmitting data over the public switched network 3.

The voice templates are recorded using the vocoder 72 & 82 so that this will remain in the phone as the identity of the user in a compressed format. The voice templates are voice identification of a pre-record speech of a user, such as "My name is John Doe". These voice templates can be changed at any time when the phone is not active and has entered into the recording mode. The checksum of the voice template will be generated as a result of the voice template.

Figure 3:
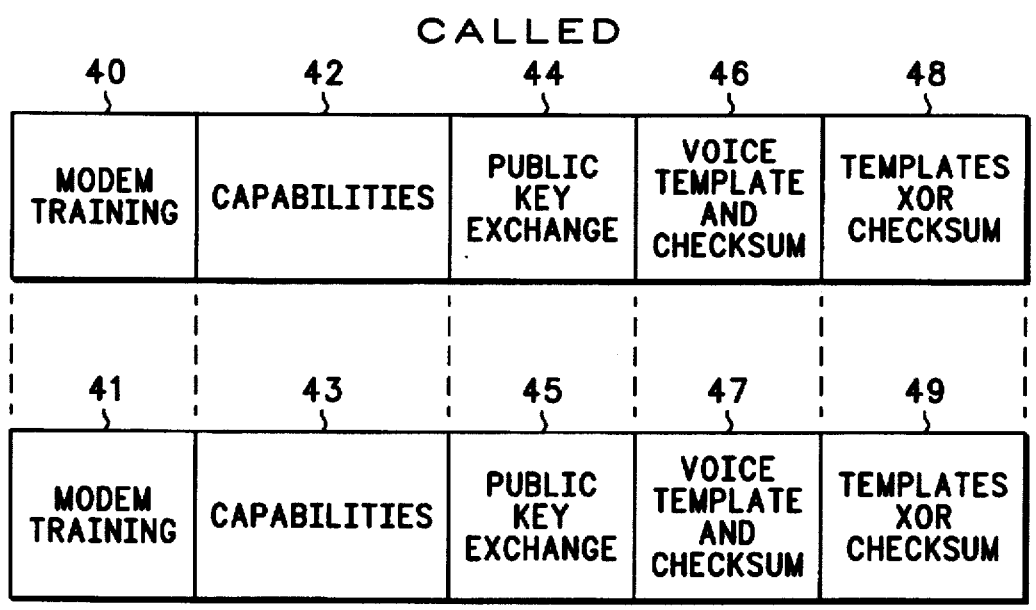
FIG. 3 is a data flow diagram of messages interchanged by users in accordance with the present invention.

Refering to FIG. 3, the signalling between the two commercial secure phones is carried out in the following manner over a full duplex communications link. In order to achieve the signalling between the phones, a modem training sequence 40 (caller) & 41 (calling) must occur which will establish a digital link between the modems using industry standard modem call setup methodologies such as V.32 bis.

The next messages sent in the signalling sequence are the capabilities messages 42 & 43 which are pre-defined messages which determine what functions each phone is capable of performing. These capabilities describe such things as the negotiation of bit rates for data or voice, full duplex or half duplex, voice coder capabilities, and asynchronous or synchronous operation.

The public key exchange 44 & 45 will occur between each unit which allows a public key to be used by the other party for encrypting the voice sent across the link. Some examples of public key algorithms are: RSA, Diffie-Hellman, and Elliptic Curves.

The voice template 46 & 47 representing a digitized representation of the user's voice is sent acoss the link with a corresponding checksum of this template.

The voice templates 46 & 47 will go through an exclusive-OR process within each phone and the resulting checksum (48 & 49) is sent out covered using the public key from the other end.

Figure 2:
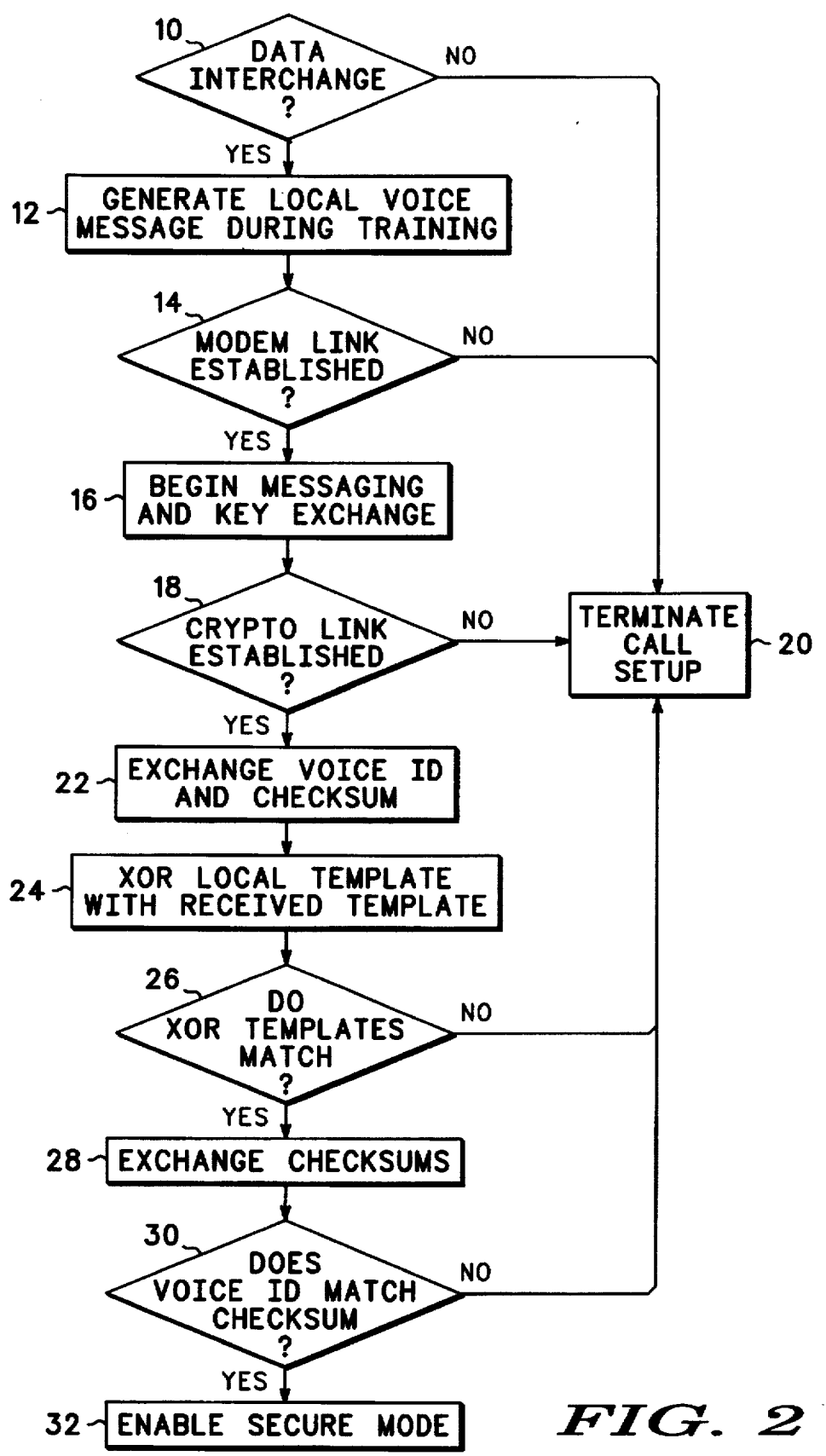
FIG. 2 is a flow chart of an authentication method in accordance with the present invention.

Referring to FIG. 2, the flow chart describes what occurs within the commercial secure phone during the voice authentication sequence. During the data interchange, block 10, which includes initiating of the modem training sequence a local voice message is played for the user, block 12.

Once the modem link is established, block 14, the phones will begin the capabilities and key exchange, block 16. If the link is not established the phone will terminate the secure call setup, block 20, and return to normal (non-secure) voice communications.

The capabilities and key exchange will create the encrypted link, block 18, using the public key method. The phones 1 & 2 will exchange the digitized voice templates and the corresponding checksum, block 22.

The local voice template is exclusive ORed with the received template and a corresponding checksum is generated, block 24.

The resulting checksum of the templates should match, block 26 on each end of the link and to verify the checksum is sent using the encrypted link to the other phone. If the checksums do not match the call is terminated, block 20.

Once the checksum tests pass each commercial secure phone will enable the secure mode, block 32 and allow secure voice communications.

This invention is an important piece to the commercial security industry that has begun to emerge. Its importance is tied to two factors: (1) the voice authentication method combined with a preliminary message provides a gap to fill in time that the user has to wait for the secure conversation to begin (2) the associated voice template is used to authenticate the user you are talking to in a calling ID fashion (secure conversation can not begin until the template exchange is validated).

This invention is intended to provide a message to each party in the conversation such as "You are entering a secure conversation with . . . " followed by the voice template from the other party. So the resultant message would sound like "You are entering a secure conversation with John Doe". Each party can enter a special password instead of their name to create even higher levels of authentication only known by each party in the conversation.

This invention will inhibit the secure conversation until the voice template is validated. Thereby, defeating the "man in the middle" scenario whereas two extra secure phones are purchased and intentionally placed between the parties so as to eavesdrop on the content of the call.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A communication system user authentication method comprising the steps of:

establishing a communication link through a modem between a calling party and a called party;

exchanging digital voice identification data by the calling party and the called party;

exclusive-ORing by the calling party the digital voice identification data of the calling party with the digital voice identification data of the called party to produce a first exclusive-OR;

exclusive-ORing by the called party the digital voice identification data of the called party with the digital voice identification data of the calling party to produce a second exclusive-OR;

exchanging said first exclusive-OR and said second exclusive-OR by the calling party and the called party;

determining by both the calling party and the called party whether the digital voice identification data which is received compares with the digital voice identification data which is transmitted, said determining step comprising the step of comparing said first exclusive-OR and said second exclusive-OR;

enabling by both the calling party and the called party a secure call on the communication link between the calling party and the called party, if the voice identification data which is received compares with the voice identification data which is transmitted; and terminating by either the calling party or the called party the communication link, if the voice identification data which is received does not compare with the voice identification data which is transmitted.

2. The communication system user authentication method as claimed in claim 1, wherein there is further included the steps of:

generating by the calling party said digital voice identification data to be a digitally compressed voice message of a voice of the calling party; and storing the digitally compressed voice message within the telephone of the calling party.

3. The communication system user authentication method as claimed in claim 2, wherein there is further included the steps of:

generating by the called party said digital voice identification data to be a digitally compressed voice message of a voice of the called party; and storing the digitally compressed voice message within the telephone of the called party.

4. The communication system user authentication method as claimed in claim 3, wherein there is further included a step of calculating a checksum over the digitally compressed voice message of the calling party.

5. The communication system user authentication method as claimed in claim 4, wherein there is further included a step of calculating a checksum over the digitally compressed voice message of the called party.

6. The communication system user authentication method as claimed in claim 5, wherein the step of exchanging digital voice identification data includes the step of transmitting the digitally compressed voice message of the calling party and the checksum over the digitally compressed voice message of the calling party to the called party.

7. The communication system user authentication method as claimed in claim 6, wherein the step of exchanging digital voice identification data further includes the step of transmitting the digitally compressed voice message of the called party and the checksum over the digitally compressed voice message of the called party to the calling party.

8. The communication system user authentication method as claimed in claim 7, wherein there is further included the step of:

terminating by the calling party the communication link between the calling party and the called party, if the first exclusive-OR and the second exclusive-OR do not compare.

9. The communication system user authentication method as claimed in claim 8, wherein there is further included the step of:

terminating by the called party the communication link between the calling party and the called party, if the first exclusive-OR and the second exclusive-OR do not compare.

10. The communication system user authentication method as claimed in claim 9, wherein there is further included the steps of, if the first exclusive-OR and the second exclusive-OR compare:

determining by the calling party whether the checksum over the digitally compressed voice message of the calling party and the checksum over the digitally compressed voice message of the called party compare;

terminating by the calling party the communication link between the calling party and the called party, if the checksum over the digitally compressed voice message of the calling party and the checksum over the digitally compressed voice message of the called party do not compare; and enabling the secure call between the calling party and the called party, if the checksum over the digitally compressed voice message of the calling party and the checksum over the digitally compressed voice message of the called party compare.

11. The communication system user authentication method as claimed in claim 10, wherein there is further included the steps of, if the first exclusive-OR and the second exclusive-OR compare:

determining by the called party whether the checksum over the digitally compressed voice message of the calling party and the checksum over the digitally compressed voice message of the called party compare;

terminating by the called party the communication link between the calling party and the called party, if the checksum over the digitally compressed voice message of the calling party and the checksum over the digitally compressed voice message of the called party do not compare; and enabling the secure call between the calling party and the called party, if the checksum over the digitally compressed voice message of the calling party and the checksum over the digitally compressed voice message of the called party compare.

12. A telephone for use in a communication system, said telephone including a user authentication method comprising the steps of:

establishing a communication link through a modem between a calling party and a called party;

exchanging by the calling party and the called party a digitally compressed voice message and a checksum over the digitally compressed voice message;

determining by both the calling party and the called party whether the digitally compressed voice message and the checksum over the digitally compressed voice message which is received compares with the digitally compressed voice message which is transmitted;

enabling by both the calling party and the called party a secure call on the communication link between the calling party and the called party, if the digitally compressed voice message and the checksum over the digitally compressed voice message which is received compares with the digitally compressed voice message and the checksum over the digitally compressed voice message which is transmitted; and terminating by either the calling party or the called party the communication link, if the digitally compressed voice message and the checksum over the digitally compressed voice message which is received does not compare with the digitally compressed voice message and the checksum over the digitally compressed voice message which is transmitted.

13. The communication system user authentication method as claimed in claim 12, wherein there is further included the step of exclusive-ORing by the calling party the digitally compressed voice message of the calling party with the digitally compressed voice message of the called party to produce a first exclusive-OR.

14. The communication system user authentication method as claimed in claim 13, wherein there is further included a step of exclusive-ORing by the called party the digitally compressed voice message of the called party with the digitally compressed voice message of the calling party to produce a second exclusive-OR.

15. The communication system user authentication method as claimed in claim 14, wherein there is further included the steps of:

determining by the calling party whether the first exclusive-OR and the second exclusive-OR compare; and terminating by the calling party the communication link between the calling party and the called party, if the first exclusive-OR and the second exclusive-OR do not compare.

16. The communication system user authentication method as claimed in claim 15, wherein there is further included the steps of:

determining by the called party whether the first exclusive-OR and the second exclusive-OR compare; and terminating by the called party the communication link between the calling party and the called party, if the first exclusive-OR and the second exclusive-OR do not compare.

17. The communication system user authentication method as claimed in claim 16, wherein the step of enabling is performed, if the first exclusive-OR and the second exclusive-OR compare and if the checksum over the digitally compressed voice message of the calling party and the checksum over the digitally compressed voice message of the called party compare.

* * * * *